United States Patent
Dorenbosch et al.

(10) Patent No.: US 9,300,708 B2
(45) Date of Patent: Mar. 29, 2016

(54) CONNECTING TO A MULTIMEDIA BROADCAST/MULTICAST SERVICE CHANNEL

(75) Inventors: Jheroen P. Dorenbosch, Paradise, TX (US); Anand B. Alen, Flower Mound, TX (US)

(73) Assignee: Google Technology Holdings LLC, Mountain View, CA (US)

( * ) Notice: Subject to any disclaimer, the term of this patent is extended or adjusted under 35 U.S.C. 154(b) by 1921 days.

(21) Appl. No.: 12/366,117

(22) Filed: Feb. 5, 2009

(65) Prior Publication Data

US 2010/0197265 A1 Aug. 5, 2010

(51) Int. Cl.
| | |
|---|---|
| *H04M 11/04* | (2006.01) |
| *H04L 29/06* | (2006.01) |
| *H04W 4/22* | (2009.01) |
| *H04W 76/00* | (2009.01) |

(52) U.S. Cl.
CPC ........ H04L 65/4061 (2013.01); H04L 65/1069 (2013.01); H04L 65/4076 (2013.01); H04W 4/22 (2013.01); H04W 76/007 (2013.01)

(58) Field of Classification Search
None
See application file for complete search history.

(56) References Cited

U.S. PATENT DOCUMENTS

| 2006/0200576 A1 | 9/2006 | Pickens et al. | |
| 2008/0059998 A1* | 3/2008 | McClenny et al. | 725/33 |
| 2009/0036152 A1* | 2/2009 | Janneteau et al. | 455/503 |
| 2009/0185522 A1* | 7/2009 | Periyalwar et al. | 370/328 |
| 2010/0265867 A1* | 10/2010 | Becker et al. | 370/312 |

FOREIGN PATENT DOCUMENTS

| WO | 03052611 A1 | 6/2003 |
| WO | 2007052182 A2 | 5/2007 |

OTHER PUBLICATIONS

3GPP TR 23.847 v8.0.0, #rd Generation Partnership Project; Technical Specification Group Services and System Aspects; Enhancements to IMP service functionalities facilitating multicast bearer services (Release 8), Dec. 2007, Sections 5.2.3.1 and 5.2.3.2.1.

* cited by examiner

*Primary Examiner* — German J Viana Di Prisco
(74) *Attorney, Agent, or Firm* — Byrne Poh LLP (57) ABSTRACT

A method, a base station, an application server and a mobile device for transmitting and receiving media content are disclosed. A transceiver 302 may receive a unicast transmission specification and a broadcast transmission specification for the media content. A processor 304 may determine if a broadcast transmission for the media content is available. The processor 304 may initiate a unicast reception mode to receive the media content based on the unicast transmission specification if the current broadcast transmission is not available. A memory 308 may store the broadcast transmission specification for later reception of the media content in a broadcast reception mode if the current broadcast transmission is not available.

2 Claims, 9 Drawing Sheets

CONNECTING TO A MULTIMEDIA BROADCAST/MULTICAST SERVICE CHANNEL

FIELD OF THE INVENTION

The present invention relates to a method and system for transmitting media content to multiple users. The present invention further relates to the use of multimedia broadcast multicast service to transmit media content to multiple users.

INTRODUCTION

An application server may transmit media content to a mobile device using a broadband system, such as a universal mobile telecommunication system (UMTS), a long term evolution (LTE) system, a WiMAX system, and other broadband telecommunication systems. The broadband system may use multimedia broadcast multicast system (MBMS) to transmit the media content. The MBMS may provide the same media content to multiple users from as few as a single transmission source, while still receiving transmissions from each user.

However, the MBMS may be available in a limited portion of the broadband network, with only a set few base stations, or cells, of the broadband network providing the MBMS. For mobile devices that wish to access the media content, but do not have access to a MBMS cell, the mobile device may still receive the media content via a unicast session. A unicast session may provide a single transmission from a cell to a user. After the mobile device has selected between the unicast session and the multicast session, the unselected option may be forgotten.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, a mobile device, an application server, and a base station, and other embodiments that relate to the basic concepts of the invention. The mobile device may be any manner of computer or wireless communication device.

A method, a base station, and application server, and a mobile device for transmitting media content are disclosed. A memory may store a unicast transmission specification or a broadcast transmission specification for the media content. A transceiver may determine if a broadcast transmission for the media content is available. The transceiver may receive the media content via a unicast transmission if the broadcast transmission is not available, referred to herein as a unicast reception mode. The transceiver may then receive the media content via a broadcast transmission based on the store broadcast transmission specification when the broadcast transmission becomes available.

Many broadband systems, such as a universal mobile telecommunication system (UMTS), a long term evolution (LTE) system, a WiMAX system, and other broadband telecommunication systems, may deliver media content, such as internet protocol television (IPTV), voices, music, and images, via a multimedia broadcast multicast service (MBMS). The term media content as used here may include media services and other media technologies. A MBMS may describe the delivery of a multicast of broadcast user plane data to one or more mobile devices. A MBMS may efficiently transmit media content to a large number of recipients, because a cell that applies MBMS transmits a single copy of the data. A MBMS, however, may be less efficient when the number of recipients in a cell is small or zero. For this reason, MBMS may normally be used in a limited number of the cells of a broadband system. These cells may be referred to as a MBMS service area or broadcast zone. The broadcast zone for media content may contain the cells where the number of recipients for the media content is expected to be large. A recipient located outside the broadcast zone may still receive the service via unicast.

The server may deliver the data, or media content or media stream, via a multicast, broadcast, or "enhanced" broadcast. With multicast, a mobile device 106 may send a "Join" request to obtain the service. With broadcast, a cell of the broadcast zone may unconditionally transmit a bearer. In an enhanced broadcast, the cell may transmit the media content if the base station of the cell may determine the presence of at least one mobile device 106 interested in receiving the media content. A LTE MBMS may support MBMS in point-to-multipoint mode and in a single frequency network (SFN) mode. For SFN, adjacent cells may simulcast the data at the same time on the same frequency to improve coverage and to facilitate seamless mobility within the broadcast zone. For the purposes of this invention, any of these media content delivery methods may be used, thus the terms broadcast and multicast may be used interchangeably in these circumstances.

As an example of a broadcast zone, the broadcast zone for a Chicago local IPTV service may be limited to the cells in downtown Chicago. Another example of such a broadcast zone may be a public safety channel broadcast to a public safety talkgroup in the cells within the normal operational area of several members of the public safety group, such as near a hospital or firehouse.

Figure 1:
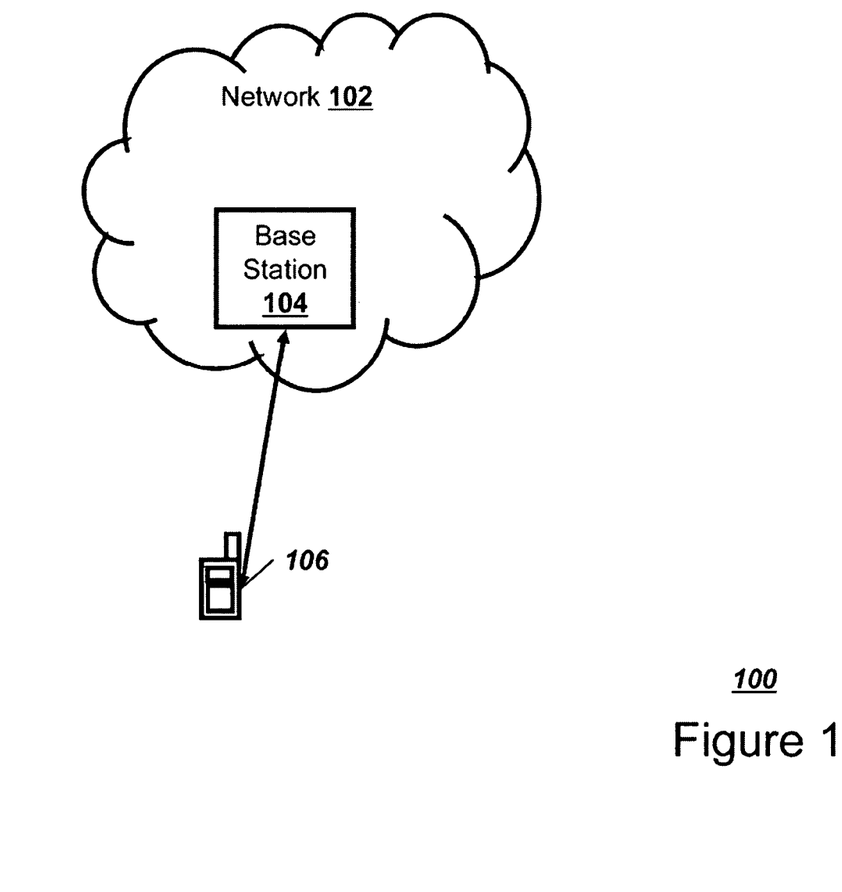
FIG. 1 is a block diagram that illustrates one embodiment of a communication system.

FIG. 1 illustrates one embodiment of a communication system 100 that may implement both broadcast transmissions and unicast transmissions. The communication system 100 may include a network 102, one or more base stations 104, and at least one mobile device 106, such as a user equipment (UE). Each base station 104 may serve one or more cells of the system. Various communication devices may exchange data or information through the network 102. The network 102 may be a WiMAX network, an LTE network, or other type of telecommunication network. A network entity, such as the access point or base station 104, may connect the mobile device 106 to the network 102. For one embodiment, the base station 104 may be a distributed set of servers in the network. The mobile device 106 may be one of several types of handheld or mobile devices, such as, a mobile phone, a laptop, or a personal digital assistant (PDA). For one embodiment, the mobile device 106 may be a WiFi capable device, a WiMax capable device, or other wireless devices.

Figure 2:
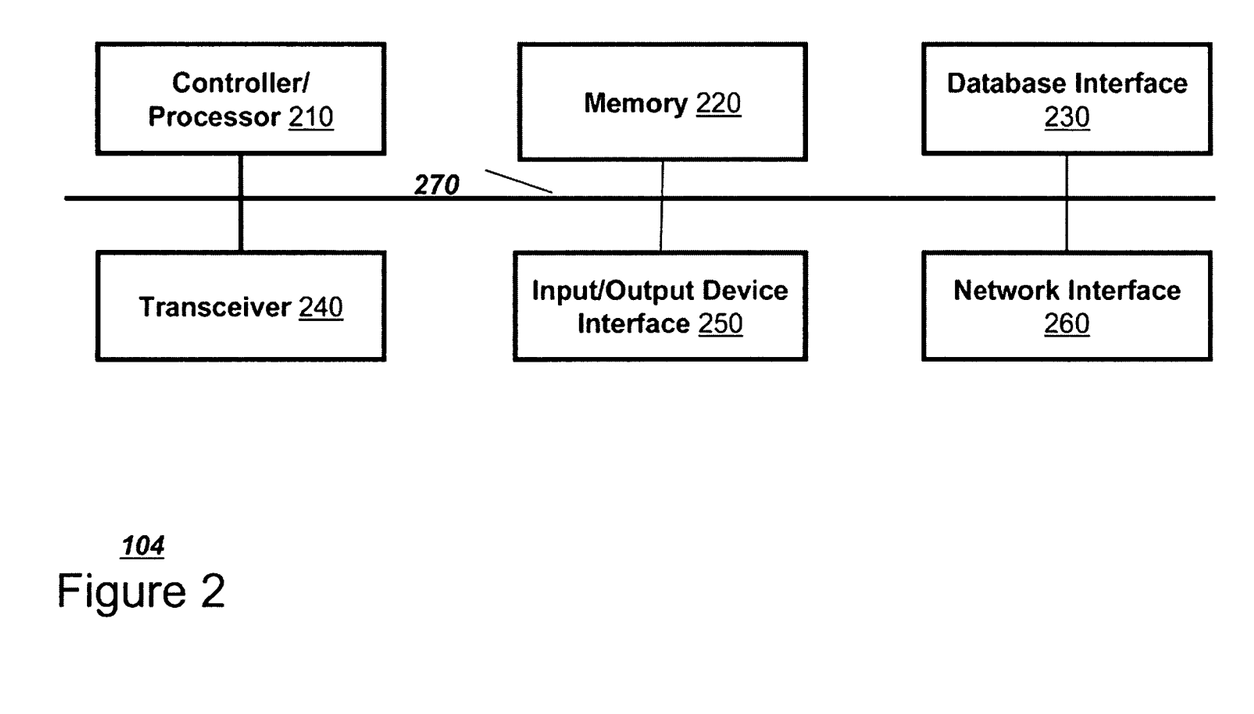
FIG. 2 is a block diagram that illustrates a possible configuration of a computing system to act as a base station.

FIG. 2 illustrates a possible configuration of a computing system to act as a base station 104. The base station 104 may include a controller/processor 210, a memory 220, a database interface 230, a transceiver 240, input/output (I/O) device interface 250, and a network interface 260, connected through bus 270.

The controller/processor 210 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain any formatting data to connect the mobile device 106 to the network 102.

The transceiver 240 may create a data connection with the mobile device 106. The transceiver may use a transmitter array to create a downlink and uplink control channel between the base station 104 and the mobile device 106.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 104. The network connection interface 260 may be used to connect a client device to a network. The components of the base station 104 may be connected via an electrical bus 270, for example, or linked wirelessly.

Base station software and databases may be accessed by the controller/processor 210 from memory 220, and may include, for example, database applications, word processing applications, as well as components that embody the decision support functionality of the present invention. The base station 104 may implement any operating system, such as Microsoft Windows®, LINUX, or UNIX, for example. Base station software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
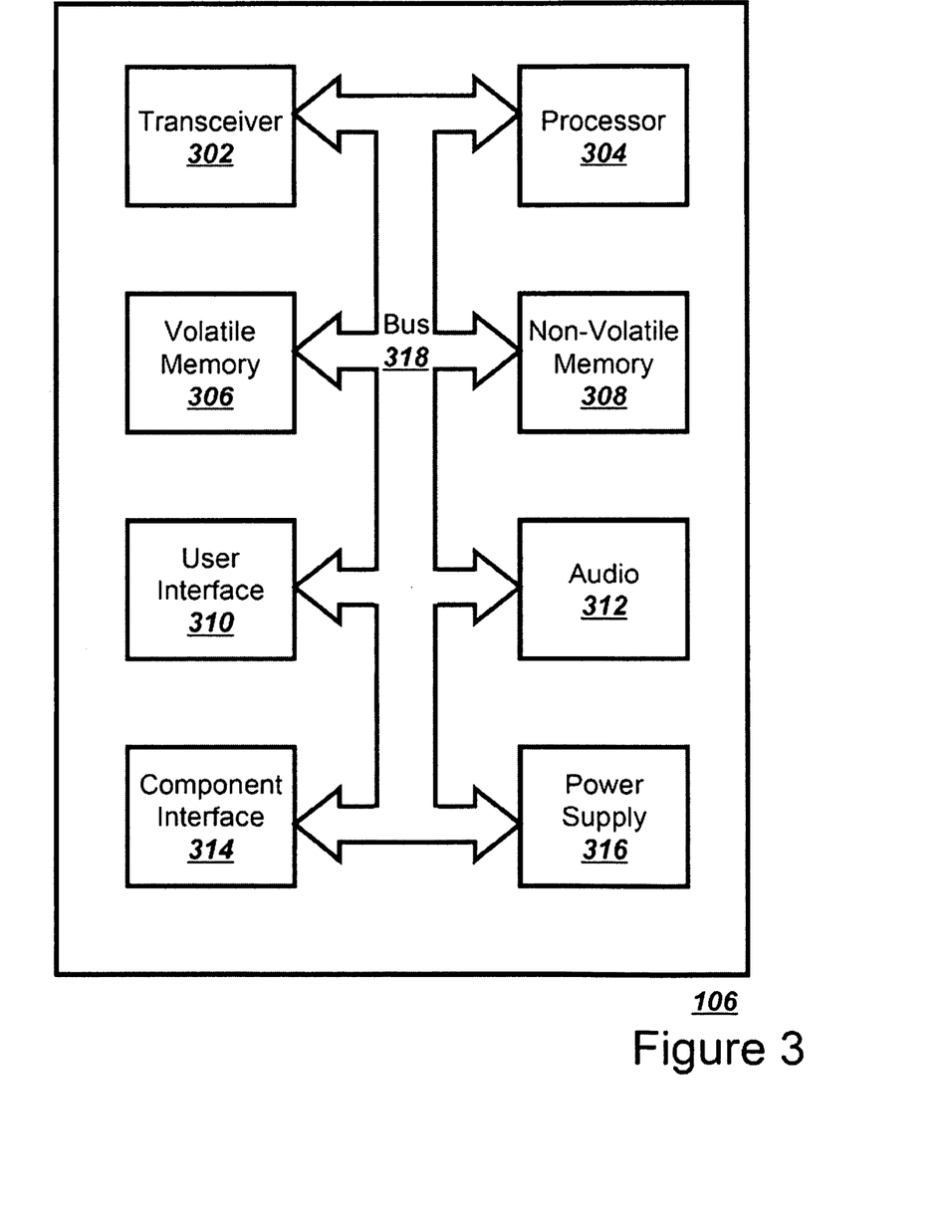
FIG. 3 is a block diagram that illustrates one embodiment of the user communication device.

FIG. 3 illustrates one embodiment of a mobile station 106, or terminal, capable of acting as a mobile device 106. The mobile device 106 may be capable of accessing the information or data stored in the network 102. For some embodiments of the present invention, the mobile device 106 may also support one or more applications for performing various communications with the network 102. The mobile device 106 may be a handheld device, such as, a mobile phone, a laptop, or a personal digital assistant (PDA). For some embodiments of the present invention, the mobile device 106 may be WiFi® capable device, which may be used to access the network 102 for data or for voice using VOIP.

The mobile device 106 may include a transceiver 302, which is capable of sending and receiving data over the network 104. The mobile device 106 may include a processor 304 that executes stored programs. The mobile device 106 may also include a volatile memory 306 and a non-volatile memory 308 which are used by the processor 304. The mobile device 106 may include a user input interface 310 that may comprise elements such as a keypad, display, touch screen, and the like. The mobile device 106 may also include a user output device that may comprise a display screen, a tactile output device, and an audio interface 312 that may comprise elements such as a microphone, earphone, and speaker. The mobile device 106 also may include a component interface 314 to which additional elements may be attached, for example, a universal serial bus (USB) interface or a global positioning system (GPS) module. Finally, the mobile device 106 may include a power supply 316. The transceiver 302, processor 304, volatile memory 306, non-volatile memory 308, user input interface 310, user output interface, audio interface 312, component interface 314, and power supply 316 may be connected via bus 318.

Figure 4:
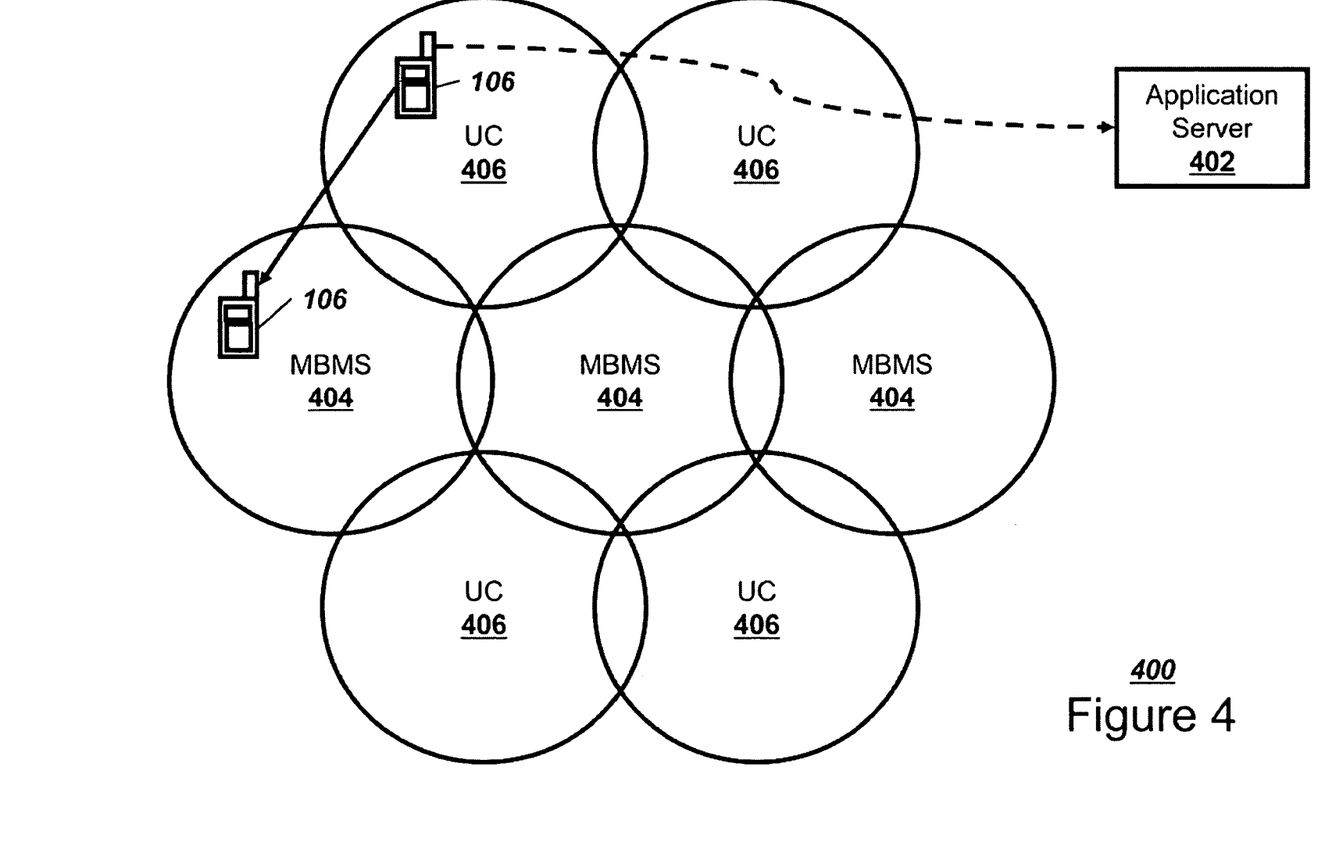
FIG. 4 is a block diagram that illustrates one embodiment of a hybrid unicast-broadcast communication system.

FIG. 4 illustrates one embodiment of a hybrid unicast-broadcast communication system 400. One or more application servers 402 may provide services to one or more mobile devices 106 within a network 102. The one or more application servers 402 may have the same general structure and functionality as shown in FIG. 2. The one or more application servers 402 may have a controller/processor 210, a memory 220, a database interface 230, an I/O device interface 250, and a network interface 260, connected through a bus 270. Application servers 402 typically may not have a transceiver 240, and may communicate with mobile devices 106 via base stations 104 or access points of a network 102.

The one or more application servers 402 and the one or more mobile devices 106 may use session initiation protocol (SIP), as specified in Request For Comments (RFC) 3261© published by the Network Working Group of the Internet Engineering Task Force. The application server may be a session initiation protocol (SIP) application server. For example, the server may be the application server associated with a video head-end, an IPTV server, a push to talk over cellular server, or another dispatch server associated with a dispatch group. The application server 402 may provide a service by delivering media content to one or more mobile devices 106. The media content may be delivered in the context of a session. The session may be of finite duration and may involve providing media content and other information to the mobile device 106.

The application server 402 may use the one or more base stations 104 to deliver the media content in the cells of the communication network 102 to one or more mobile devices 106. The application server 402 may deliver the media content to a specific mobile device 106 via a cell local to that mobile device 106. The application server 402 may provide the media content via MBMS in a subset of the cells 404 of the communication network 102. This subset of cells may form the broadcast zone for the media content. The application server may provide the media content in unicast transmission in the other cells 406 of the network 102. Typically the media content may be available in unicast transmission mode in all cells, such as the cells 404 of the broadcast zone. If the cell local to the mobile device 106 is in the broadcast zone, and is thus in a cell that is MBMS-enabled for the media content, referred to here as a MBMS cell 404, the MBMS cell 404 may direct a broadcast transmission to the mobile device 106 using a MBMS. If that cell is not MBMS enabled for the media content, referred to here as a unicast (UC) cell 406, the UC cell 406 may direct a unicast transmission of the media content to the mobile device 106. Note that the references to the MBMS cell 404 and the UC cell 406 may be media content specific. A UC cell may broadcast other media content to the same mobile device 106 or to other mobile devices. When the mobile device 106 is to receive the media content, the mobile device 106 may determine whether the local cell providing the connection to the network 102 is a MBMS cell 404 or a UC cell 406 for that media content. If the cell is not a MBMS cell 404 providing a broadcast transmission for that application server 402 and is a UC cell 406, the mobile device 106 may receive the media content in a unicast reception mode from the UC cell 406. If the cell is a MBMS cell 404 providing a broadcast transmission of the media content, the mobile device 106 may receive the media content in a broadcast transmission from the MBMS cell 404, referred to herein as a broadcast reception mode. If the cell is a MBMS cell 404, the mobile device 106 may also receive the media content in a unicast transmission from the MBMS cell 404. When several mobile devices are to receive the media content in the same cell 404, the use of broadcast transmission mode is more efficient than the use of unicast transmission mode. With unicast transmission, the base station 104 serving the cell 404 may transmit a separate copy of the media content to each of the several mobile devices, while with broadcast transmission the base station 104 may transmit a single copy of the media content. When a very large number of mobile devices receive the media content in the same cell, the use of unicast transmission for each of the very large number of mobile device may become difficult due to the large number of separate unicast copies of the media content exhausting the bandwidth or the capacity of the cell. This problem may be exacerbated in emergency situations, when a large number of emergency personnel may aggregate at a common location served a limited number of common cells 406.

A mobile device 106 may be using unicast to receive a service, and then roam into a MBMS cell 406 of a broadcast zone for the service. The mobile device 106 may continue to use the unicast delivery option obtained from the application server 402, causing a handoff or handover of the unicast media content stream to an MBMS cell 406. The MBMS cell 406 may already be transmitting a broadcast copy of the service. Thus this handover may cause the cell to transmit both a MBMS copy and a unicast copy of the same service. Moreover, after the handover, the application server 402 may provide two copies of the bearer data to the base station 104, one for UC transmission and one for broadcast transmission, thereby creating an increased load on the backhaul between the application server 402 and the base station 104. Similarly, the mobile device 106 may continue to use unicast delivery in a UC cell 404 after MBMS delivery becomes available in that cell, changing the UC cell 404 to a MBMS cell 406, causing the cell to transmit both a MBMS copy and a unicast copy of the same service.

Preemptively storing the broadcast transmission specification may provide rapid and efficient switching from unicast mode to broadcast mode as soon as the broadcast mode is available. Such switching may be enabled at the mobile device 106 by storing the broadcast transmission specification when it is initially obtained, and retaining the broadcast transmission specification when the mobile device 106 uses unicast reception mode. The mobile device 106 may then later use the stored broadcast transmission specification to quickly switch from the unicast reception mode to a broadcast reception mode when that mode becomes available, ending the need for the base station 104 to transmit a copy of the unicast media content stream. This way, the switching may be accomplished without the need for the application server 402 to explicitly instruct the mobile device 106 to switch.

In general, an application server 402 or another entity in the system may inform the mobile device 106 about how to establish a bearer connection for the service and for the media content stream or streams of service. The application server 402 may provide an electronic programming guide (EPG) that contains information about the service. Alternately, the application server 402 may send another service announcement that contains such information. The application server 402 may send such service announcements in periodic fashion. Further, the mobile device 106 and the application server 402 may execute a transaction or message exchange that allow the application server 402 to inform the mobile device 106 about the multicast bearer. For example, to initiate the service, a SIP "INVITE" transaction may be initiated by the mobile device 106 or the application server 402. An EPG or a SIP "INVITE" transaction may provide an established way to communicate bearer information from the application server 402 to a mobile device 106. The bearer information may traditionally be embedded in the session description protocol (SDP) part of the SIP transaction messages or in a SDP part of an EPG. The SDP may provide information about the codecs, the frequencies, MBMS identifiers, internet (IP) addresses and port numbers for broadcast and unicast transmissions.

To identify a MBMS bearer to a mobile device 106, the application server 402 may send a broadcast transmission specification with sufficient bearer identifier information to the mobile device 106 so that the mobile device 106 may find and decode the MBMS bearer. For example, in a LTE service, a mobile device 106 may obtain the temporary mobile group identity (TMGI) of the bearer. For example, when a mobile device 106 knows the TMGI, the mobile device 106 may inspect the control channels of a cell 404, such as a MBMS notification indicator channel (MICH) and the multicast control channel (MCCH), to determine whether and where the bearer data may be transmitted on the multicast traffic channel (MTCH). As another example, in a WiMAX service, a mobile device 106 may obtain a multicast IP address of the bearer. When the mobile device 106 knows a multicast IP address for the service, the mobile device 106 may send a "Join" request for the bearer data. A mobile device may also use the TMGI to detect MBMS notification messages or to send a "Cell Update" request to the base station 104 to indicate interest in receiving the broadcast data for that TMGI. Other wireless technologies that support MBMS, such as UMTS and WiMax, may use similar or different MBMS identifier information, referred to as the MBMS ID.

In many systems, such as systems that use the internet protocol multimedia subsystem (IMS), an application server 402 may not have precise information about the location or the cell number of a mobile device 106, due to filtering or privacy reasons. Moreover, the application server may not even know the precise definition of the broadcast zone. In general an application server 402 may not know whether a mobile device is in a UC cell 406 or in a MBMS cell 404, thus preventing the application server 402 from determining whether the mobile device 106 may attempt to use MBMS or unicast. Thus, an application server 402 may not know whether to instruct the mobile device 106 to connect to the media via unicast or via MBMS. The application server 402 may inform the mobile device 106 of the availability of both unicast and MBMS options, preferably with a preference indication for MBMS when available locally and unicast otherwise. The application server 402 may do so by providing both a unicast transmission specification for a unicast option and a broadcast transmission specification for a MBMS option. After the mobile device 106 has obtained these specifications and has determined which option to use in its current cell, the mobile device 106 may switch to that option and start the reception of the media.

Figure 5:
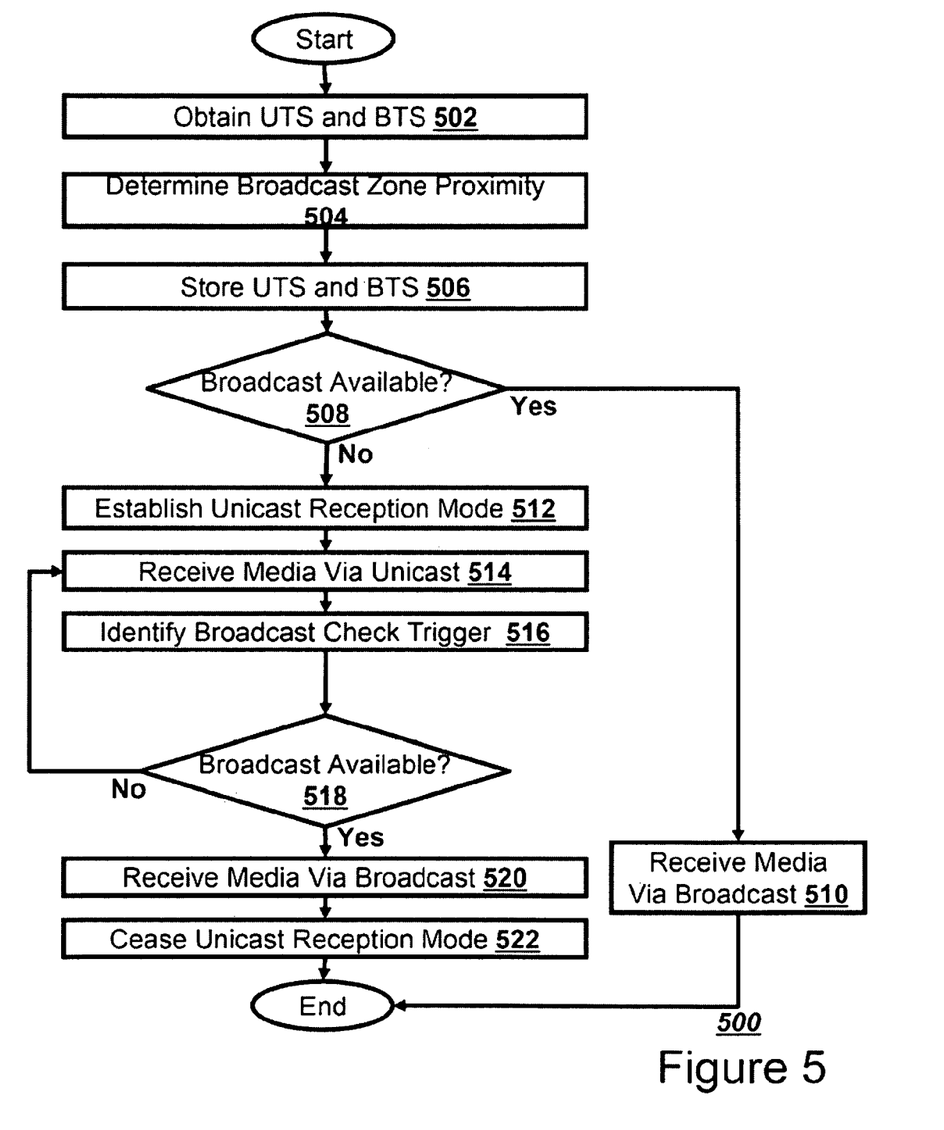
FIG. 5 is a flowchart that illustrates one embodiment of a method for establishing unicast and broadcast reception sessions.

FIG. 5 illustrates one embodiment of a method 500 for establishing unicast and multicast reception sessions for media content. The mobile device 106 may obtain a unicast transmission specification (UTS) and a broadcast transmission specification (BTS) for the media content upon initiation of a session (Block 502). The mobile device 106 may obtain a specific BTS based upon the mobile device's proximity to a specific broadcast zone. The mobile device 106 may decode one or more control channels of the local cell and of the neighbor cells to determine whether the mobile device 106 may be in a broadcast zone for the media content. The mobile device 106 may optionally use a GPS module or other positioning device to determine its proximity to a broadcast zone (Block 504). The mobile device 106 may obtain the broadcast transmission specification based upon the proximity, for example, by requesting a BTS from the application server 402 when detecting the proximity, or by capturing a BTS in an EPG transmitted in the proximity of the broadcast zone. The mobile device 106 may receive the UTS and BTS via a session setup message received as part of the SIP. The mobile device 106 may store the UTS and BTS in the memory 308 (Block 506). If the mobile device 106 ascertains that a current broadcast transmission for the media content is available according to, or as specified by the BTS (Block 508), the mobile device 106 may receive the media content in a broadcast reception mode via a broadcast transmission (Block 510). If a current broadcast transmission is not available (Block 508), the mobile device 106 may establish a unicast reception mode (Block 512). However, the mobile device may continue to store the BTS in the memory 308 for later reception of the media content in a broadcast reception mode. The mobile device 106 may receive the media content via a unicast transmission (Block 514). The mobile device may later identify a broadcast check trigger, such as a cell handover, the expiration of a broadcast check timer that operates on a periodic basis, the proximity to a broadcast zone, an emergency trigger or other triggers (Block 516). The mobile device 106 may use the stored BTS to check whether a later broadcast transmission of the media content is available in response to the broadcast check trigger. If a later broadcast transmission is not available (Block 518), the mobile device 106 may continue to receive the media content via a unicast transmission (Block 514). If a later broadcast transmission is available (Block 518), the mobile device 106 may receive the media content in a broadcast reception mode via a broadcast transmission (Block 520). The mobile device 106 may cease the unicast reception mode, for example, by exchanging SIP control messages with the application server 402 (Block 522).

Figure 6:
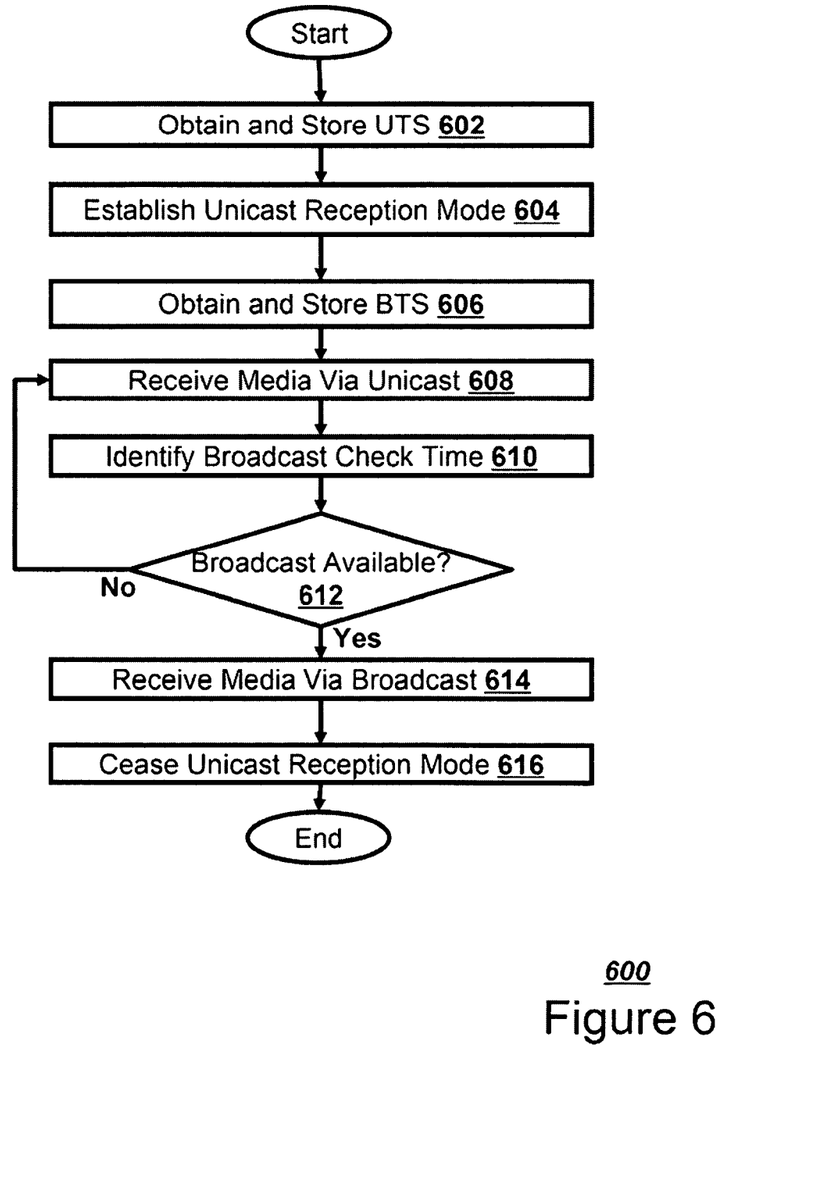
FIG. 6 is a flowchart that illustrates one embodiment of a method for establishing a broadcast alternative reception session to a unicast reception session.

FIG. 6 illustrates one embodiment of a method 600 for establishing a multicast or broadcast alternative to unicast reception of a stream of a session. The mobile device 106 may obtain a UTS for the stream and store the UTS in the memory 308 (Block 602). The mobile device 106 may establish a unicast reception mode of the stream (Block 604). The mobile device 106 may obtain and store a BTS of the same stream in the memory 308 upon or after the initiation of the unicast reception mode (Block 606). The mobile device 106 may continue to receive the stream via a unicast transmission (Block 608). Later, the mobile device may identify a broadcast check trigger, such as a cell handover, the expiration of a broadcast check timer that operates on a periodic basis, the proximity to a broadcast zone, an emergency trigger, the inspection of the control channels of the current cell, or other triggers (Block 610). The mobile device 106 may now check the availability of a later broadcast transmission of the stream according to the stored BTS, such as by decoding detailed broadcast control channel information or by searching for a broadcast user data channel that carries the stream. If a later broadcast transmission is not available (Block 612), the mobile device 106 may continue to receive the stream via a unicast transmission (Block 608). If a later broadcast transmission is available (Block 612), the mobile device 106 may receive the stream in a broadcast reception mode via a broadcast transmission (Block 614). The mobile device 106 may cease the unicast reception mode (Block 616).

Figure 7:
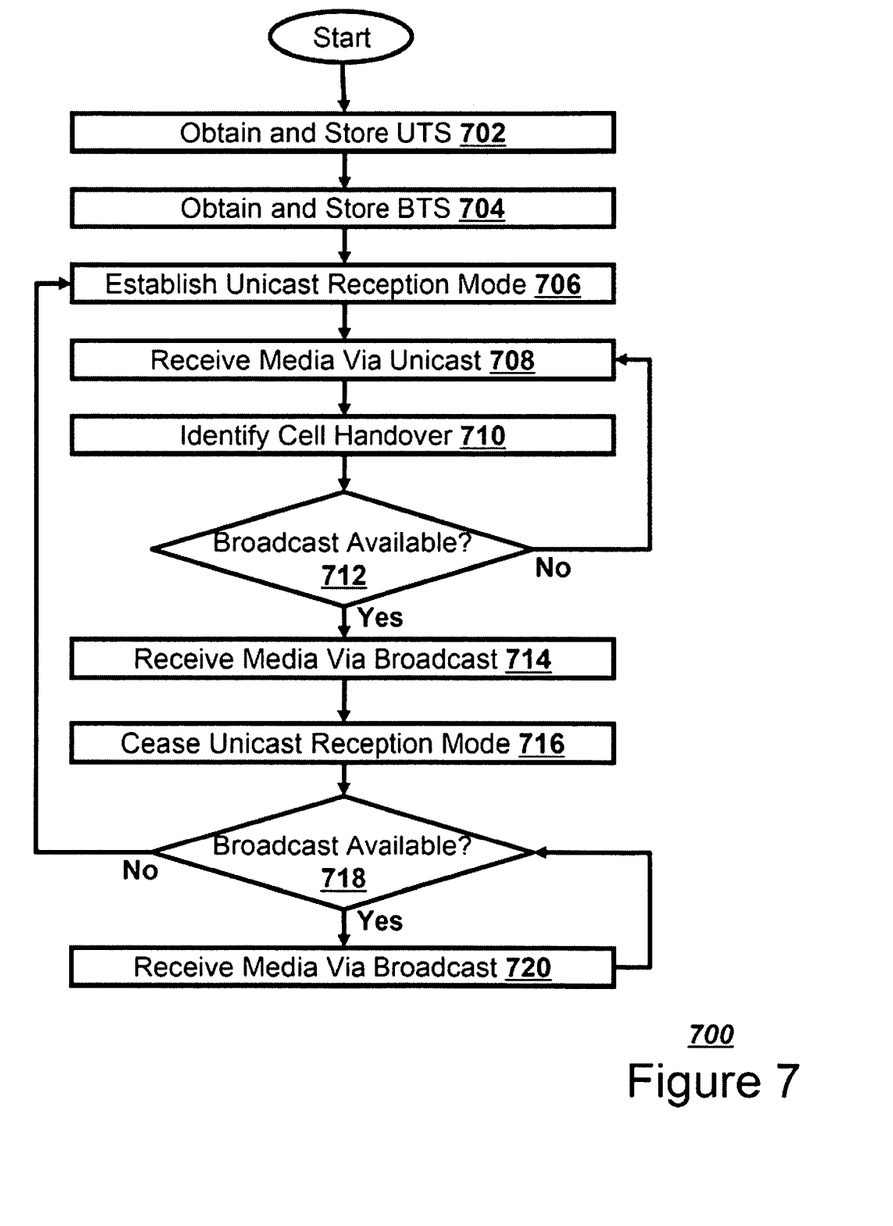
FIG. 7 is a flowchart that illustrates one embodiment of a method for switching between unicast and broadcast reception sessions.

FIG. 7 illustrates one embodiment of a method 700 for switching between unicast and multicast reception sessions of media content. The mobile device 106 may obtain a UTS for the media content and store the UTS in the memory 308 (Block 702). The mobile device 106 may obtain and store a BTS for the media content in the memory 306 (Block 704). The mobile device 106 may establish a unicast reception mode when the media content is not available locally via a current broadcast transmission (Block 706). The mobile device 106 may receive the media content via a unicast transmission and may keep the BTS stored in the memory 308 for later reception of the media content in a broadcast reception mode (Block 708). The mobile device may later identify a broadcast check trigger, such as a cell handover, the expiration of a broadcast check timer that operates on a periodic basis, the proximity to a broadcast zone, or other triggers (Block 710). If a later broadcast transmission is not available as specified by the BTS stored in the memory 308 (Block 712), the mobile device 106 may receive the media content via a unicast transmission (Block 708). If a later broadcast transmission is available (Block 712), the mobile device 106 may receive the media content in a broadcast reception mode via a broadcast transmission from a MBMS cell 404 (Block 714).

Switching from unicast reception mode to the broadcast reception mode may not require interaction between the mobile device 106 and the application server 402, allowing for rapid and economical switching. If the cell 404 uses broadcast mode, no explicit interaction may be needed between the mobile device 106 and the cell base station 104. If the cell 404 uses multicast or enhance broadcast mode, little interaction may be needed, such as a request from the mobile device 106 to "Join" the multicast. The mobile device 106 may cease the unicast reception mode (Block 716). If the mobile device 106 later determines that the later broadcast transmission is no longer available (Block 718), the mobile device 106 may restart a unicast reception mode (Block 706). If the broadcast transmission is still available (Block 718), the mobile device 106 may continue to receive the media content in a broadcast reception mode via a broadcast transmission (Block 720).

The fast and efficient switching between broadcast and unicast reception mode provided by retaining the BTS even while receiving a unicast transmission may also be useful in dealing with emergency situations. When an emergency situation occurs, the one or more base stations 104 may no longer be able to serve all mobile devices with a separate copy of the data transmission via a unicast transmission. The application server 402 or the base station 104 may detect the occurrence of the emergency situation. The emergency situation may be detected through the intervention of an operator via a user interface, such as the I/O device interface 250. The emergency situation may also be detected from an increase of the amount of traffic associated with a session or the increase of the number of mobile devices that demand access to a specific media content or session stream. If the application server 402 detects the emergency situation, the application server 402 may change or increase the extent of the broadcast zone for media content or a session stream. The application server 402 may send an indication to one or more base stations 104 that currently do not support broadcast transmission of the media content or stream. The indication identifies the emergency event to the one or more base stations 104 and instructs them to provide broadcast transmission of the media content or session stream.

Figure 8:
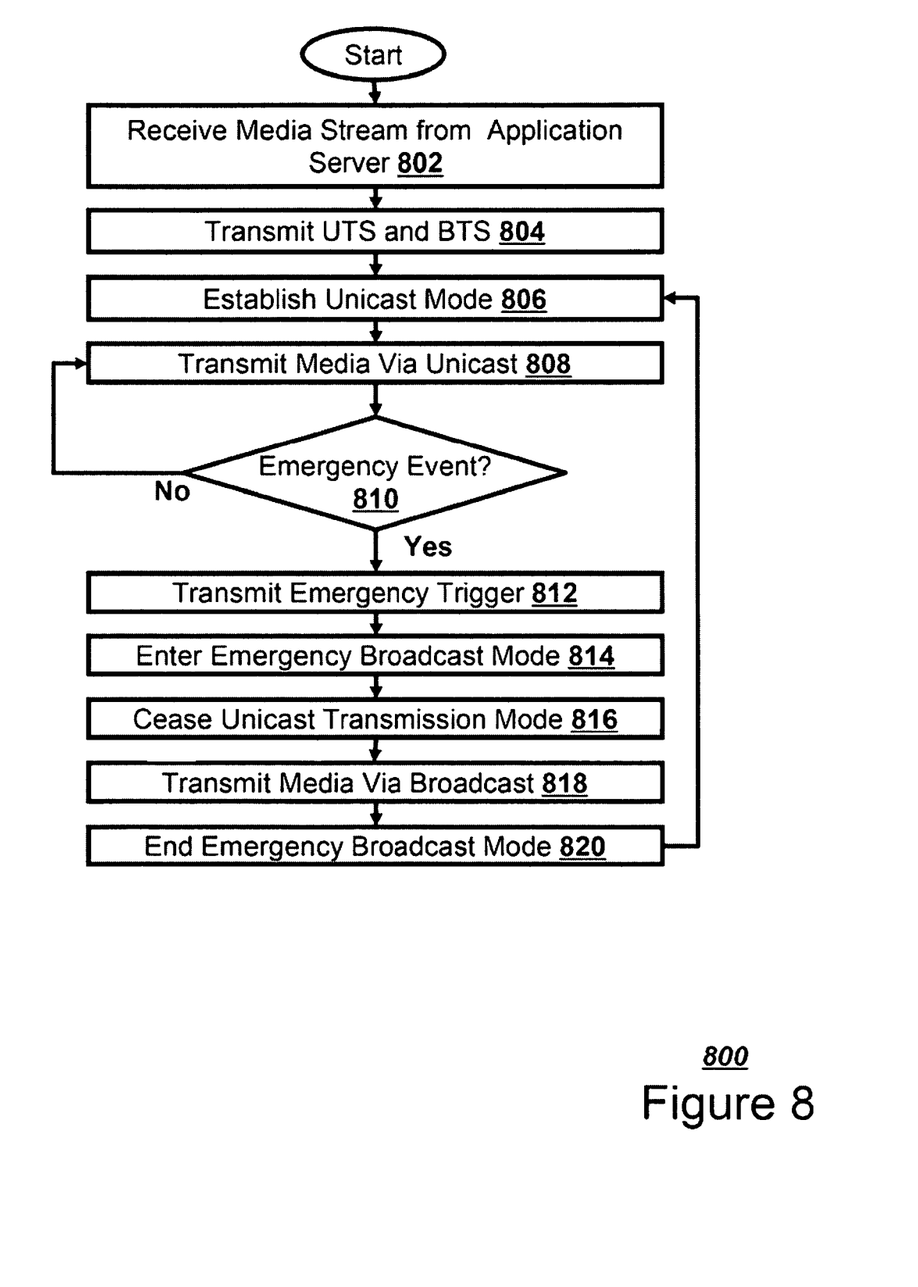
FIG. 8 is a flowchart that illustrates one embodiment of a method for switching to an emergency broadcast reception session.

FIG. 8 illustrates one embodiment of a method 800 for switching to an emergency broadcast transmission session. In a normal, non-emergency operation, the base station 104 may receive from the application server 402 a media stream in a unicast transmission mode and an emergency broadcast transmission mode. The base station 104 may transmit a UTS and a BTS to the mobile device 106 (Block 804). The base station 104 may establish a normal unicast transmission mode (Block 806). The base station 104 may transmit the data transmission via a unicast transmission (Block 808). If the base station 104 does not identify an emergency event (Block 810), the base station 104 may continue to transmit the data transmission via a unicast transmission (Block 808). If the base station 104 identifies the emergency event (Block 810), the base station 104 may optionally transmit an emergency trigger to all mobile devices 106 receiving the data transmission (Block 812). The trigger may be implemented by sending a Start Session message that indicates to the mobile devices 106 in the cell that a broadcast transmission of the media content or session stream is becoming available. The base station 104 may then enter an emergency broadcast transmission mode of the media content or session stream, becoming a MBMS cell 404 (Block 814). The switch to emergency broadcast transmission mode may cause mobile devices 106 in the cell to receive the media content of the session stream via broadcast. The base station 104 may cease the unicast transmission mode when the mobile devices 106 cease unicast reception mode (Block 816). The base station 104 may further transmit emergency messages and media content via a broadcast transmission (Block 818). Once the emergency is over, the base station 104 may end the media stream in the emergency broadcast transmission mode (Block 820). The base station 104 may reestablish the normal unicast transmission mode when the mobile devices 106 reestablish unicast reception mode (Block 806).

Figure 9:
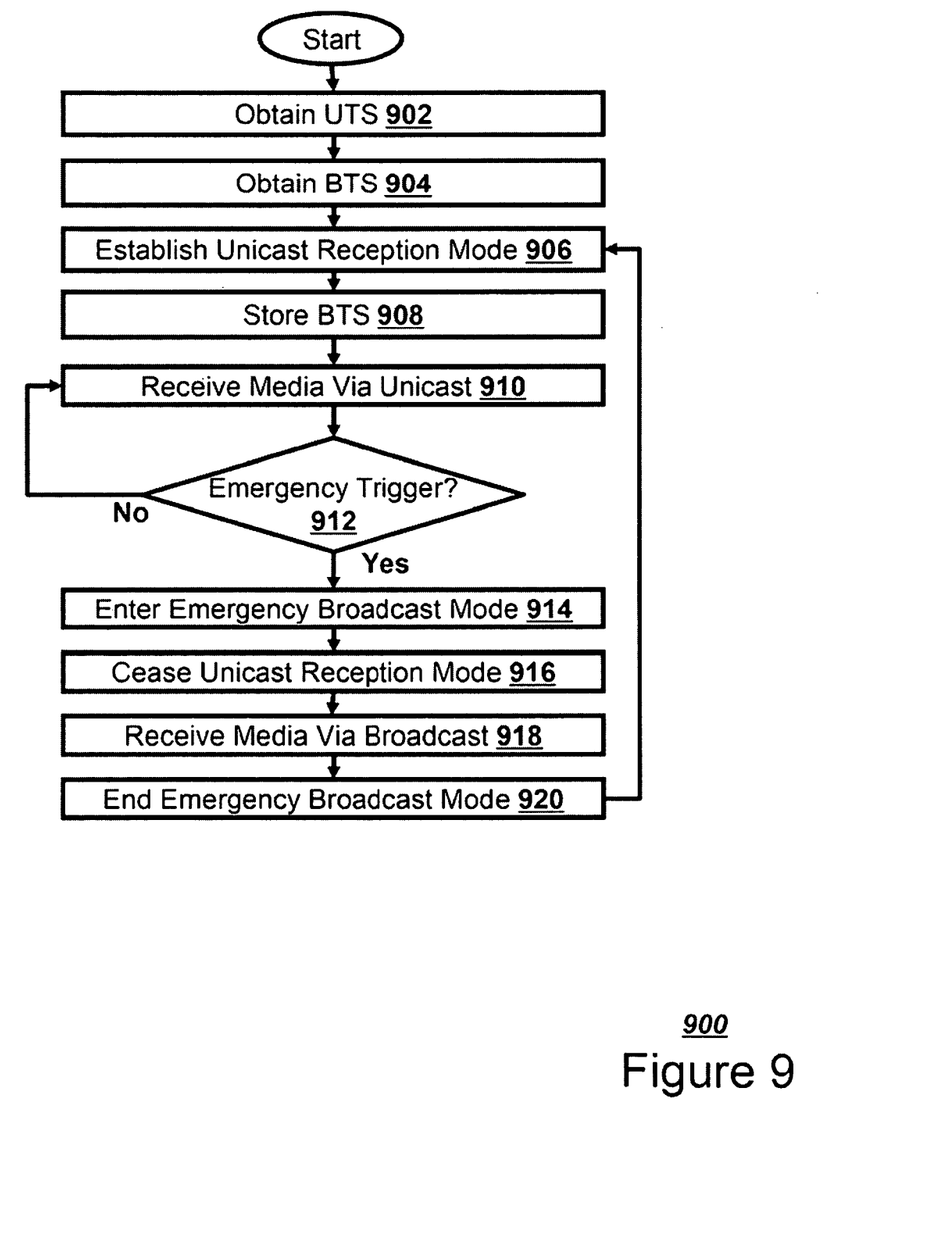
FIG. 9 is a flowchart that illustrates one embodiment of a method for switching to an emergency broadcast transmission session.

FIG. 9 illustrates one embodiment of a method 900 for switching to an emergency multicast reception session, where a mobile device 106 may enter a broadcast reception mode in response to an emergency state. The mobile device 106 may obtain a UTS for a media stream (Block 902). The mobile device 106 may also obtain a BTS for the media stream (Block 904). The mobile device 106 may establish a unicast reception mode of the media stream (Block 906). The mobile device 106 may store the BTS in the memory 308 for later reception of the media content in a broadcast reception mode (Block 908). The mobile device 106 may receive a data transmission of the media stream via a unicast transmission (Block 910). If the mobile device 106 does not receive an emergency trigger from the base station 104 (Block 912), the mobile device 106 may continue to receive the data transmission via a unicast transmission (Block 910). If the mobile device 106 later receives an emergency trigger from the base station 104 (Block 912), the mobile device 106 may enter an emergency broadcast reception mode and receive the media stream in accordance with the BTS stored in memory 308 (Block 914). The mobile device 106 may cease the unicast reception mode (Block 916). The mobile device 106 may receive emergency messages via a broadcast transmission (Block 918). Once the emergency is over, as determined by either the mobile device 106 or the base station 104, the mobile device 106 may end the emergency broadcast reception mode (Block 920). The mobile device 106 may reestablish a unicast reception mode (Block 906). The reestablishment of the unicast reception mode may result from explicit signaling between the mobile device 106 and the application server 402.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A base station for delivering an emergency broadcast, comprising:
    a network interface that receives a media stream from an application server;
    a transceiver that transmits a unicast transmission specification, a broadcast transmission specification, and the media stream in a unicast transmission mode or an emergency broadcast transmission mode; and
    a processor that identifies an emergency event and, without interaction with a server, switches from having the transceiver transmit the media stream in the unicast transmission mode to having the transceiver transmit the media stream in the emergency broadcast transmission mode.

2. The base station of claim 1, wherein the processor determines the emergency event is over and controls the transceiver to end the media stream in the emergency broadcast transmission mode.

* * * * *